United States Patent
Lee et al.

(10) Patent No.: US 8,725,116 B2
(45) Date of Patent: May 13, 2014

(54) APPARATUS AND METHOD FOR MANAGING MESSAGE IN MOBILE TERMINAL

(75) Inventors: Sung-Yeon Lee, Seoul (KR); Sun-Young Maeng, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 553 days.

(21) Appl. No.: 12/764,222

(22) Filed: Apr. 21, 2010

(65) Prior Publication Data

US 2010/0273454 A1 Oct. 28, 2010

(30) Foreign Application Priority Data

Apr. 22, 2009 (KR) .................. 10-2009-0034902

(51) Int. Cl.
*H04W 4/00* (2009.01)

(52) U.S. Cl.
USPC ......... 455/412.1; 455/466; 455/566; 709/207

(58) Field of Classification Search
USPC ........... 455/412, 412.1–414.1, 466, 456, 418; 709/206, 207
See application file for complete search history.

(56) References Cited

U.S. PATENT DOCUMENTS

| | | | |
|---|---|---|---|
| 2001/0030611 A1* | 10/2001 | O'Rourke | 340/825.25 |
| 2002/0087584 A1 | 7/2002 | Hung | |
| 2003/0061209 A1* | 3/2003 | Raboczi et al. | 707/3 |
| 2004/0110491 A1 | 6/2004 | Ozaki | |
| 2004/0137922 A1* | 7/2004 | Kang | 455/466 |
| 2007/0022172 A1* | 1/2007 | Anglin et al. | 709/207 |
| 2007/0256034 A1* | 11/2007 | Hiraoka et al. | 715/864 |
| 2007/0287429 A1* | 12/2007 | Lee | 455/414.1 |
| 2011/0269507 A1* | 11/2011 | Polis et al. | 455/566 |

FOREIGN PATENT DOCUMENTS

EP 1 617 637 A1 1/2006

* cited by examiner

*Primary Examiner* — Kamran Afshar
*Assistant Examiner* — Farideh Madani
(74) *Attorney, Agent, or Firm* — Cha & Reiter, LLC

(57) ABSTRACT

An apparatus and a method for managing a message in a mobile terminal are provided. In the method, meta data of messages stored in the terminal are analyzed and items for filtering a message are generated. A user is allowed to select at least one item. Messages corresponding to the selected item are displayed.

10 Claims, 4 Drawing Sheets

APPARATUS AND METHOD FOR MANAGING MESSAGE IN MOBILE TERMINAL

CLAIM OF PRIORITY

This application claims the benefit under 35 U.S.C. §119(a) of a Korean patent application filed in the Korean Intellectual Property Office on Apr. 22, 2009 and assigned Ser. No. 10-2009-0034902, the entire disclosure of which is hereby incorporated by reference.

BACKGROUND OF THE INVENTION

1. Field of the Invention

The present invention relates to an apparatus and a method for managing a message in a mobile terminal. More particularly, the present invention relates to an apparatus and a method for displaying a plurality of messages using a filter function.

2. Description of the Related Art

As a mobile terminal becoming increasingly popular, service providers in race to develop more convenient and capable of providing special functions. More particularly, as use of a message service such as a Short Message Service (SMS) and a multi-media message service are growing in a mobile terminal, functions that allow a user to view and manage the message service more conveniently are being studied.

For example, most of the conventional mobile terminals manage all transmitted/received messages using typical message classification boxes, such as a reception message box, a calling message box, a spam message box, a storage message box, and a permanent message box. That is, the mobile terminal separates and stores messages in the reception message box and the calling message box depending on whether each message is a received message or a calling message, and stores a relevant message in the spam message box, the storage message box, or the permanent message box.

As described above, since the conventional mobile terminal manages a message using a fixed message box, it is difficult for a user to view and manage a message according to the user's preference. The mobile terminal provides a limited function of changing an arrangement order of messages included in the message box, but simply changing the arrangement order of the messages has a limitation in meeting a user's various preferences.

In effort to improve the message management, a function called a conversation mode, which displays messages transmitted/received to/from a specific counterpart in a time order, is introduced recently. However, the conversation mode is a function of displaying only messages transmitted/received to/from only one selected counterpart, thus still fall short in meeting a user's various tastes and preferences.

Therefore, an improved message management function that can serve users' various needs in the mobile terminal is needed.

SUMMARY OF THE INVENTION

An aspect of the present invention is to address at least the above-mentioned problems and/or disadvantages and to provide additional advantages described below.

Accordingly, an aspect of the present invention is to provide an apparatus and a method for managing a message in a mobile terminal.

Another aspect of the present invention is to provide an apparatus and a method for filtering messages that meet a user setting condition and displaying the filtered message in a mobile terminal.

Still another aspect of the present invention is to provide an apparatus and a method for generating a message box including only messages that meet a user setting condition in a mobile terminal.

In accordance with an aspect of the present invention, a method for managing a message in a mobile terminal includes: analyzing meta data of messages stored in the terminal and generating items for filtering a message, allowing a user to select at least one item, and displaying messages corresponding to the selected item among the messages stored in the terminal.

In accordance with another aspect of the present invention, an apparatus for managing a message in a mobile terminal includes: a controller for analyzing meta data of messages stored in the terminal and generating items for filtering a message, allowing a user to select at least one item, and searching for messages corresponding to the selected item among the messages stored in the terminal, and a display unit for displaying the searched messages.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Exemplary embodiments of the present invention provide an apparatus and a method for filtering and displaying only messages that meet a user setting condition, and generating a message box including only filtered messages in a mobile terminal.

Figure 1:
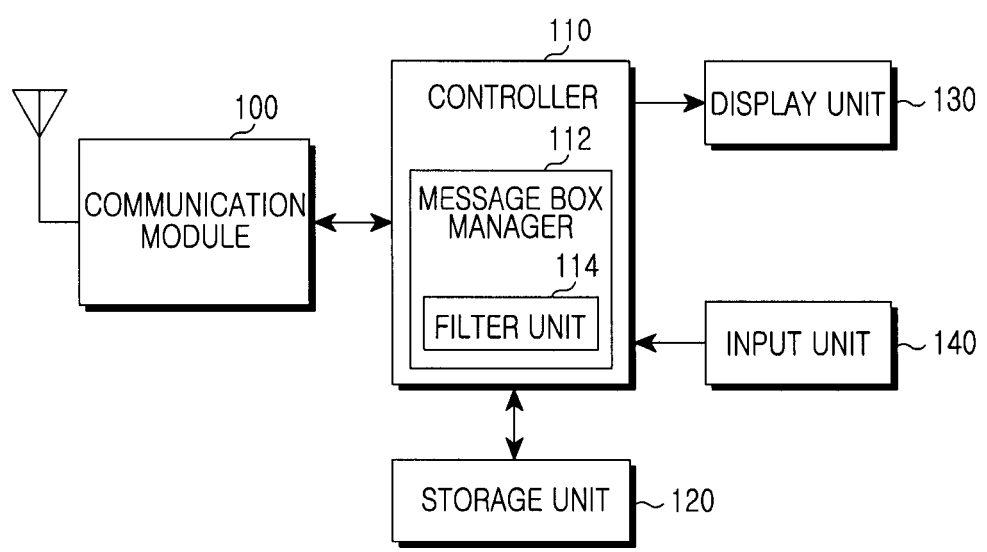
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the mobile terminal includes a communication module 100, a controller 110, a storage unit 120, a display unit 130, and an input unit 140. More particularly, according to an exemplary embodiment of the present invention, the controller 110 includes a message box manger 112. The message box manager 112 includes a filter unit 114.

In operation, the communication module 100 down-converts a Radio Frequency (RF) signal received via an antenna to a baseband signal, provides the baseband signal to the controller 110, and also up-converts a baseband signal provided by the controller 110 into an RF signal, and transmits the RF signal via the antenna.

The controller 110 controls and processes an overall operation (for example, voice communication and data communication) of the mobile terminal. According to an exemplary embodiment of the present invention, the controller 110 controls and processes function for filtering and displaying all messages according to a user setting condition and for generating a message box including filtered messages via the message box manager 112.

The message box manager 112 manages all messages by generating a reception message box, a calling message box, and another message boxes. The message box manager 112 moves all transmitted/received messages to the all message box, and manages respective messages by moving each message to the reception message box or the calling message box depending on transmission/reception information of each message.

More particularly, according to an exemplary embodiment of the present invention, the message box manager 112 analyzes meta data of each message to generate filtering items for filtering all messages. Here, the meta data includes at least one of a transmission phone number, a reception phone number, a transmission time, a reception time of each message, whether a user reads a message, whether a protection is set, and an importance degree. For example, when phone numbers of users A, B, and C are determined from transmission/reception phone numbers of respective messages as a result of the analysis of the meta data, the message box manager 112 may generate the phone numbers of the users A, B, and C as filtering items for sorting. When date information of January 1, January 3, and January 5 are determined from transmission/reception time of the respective messages, the message box manager 112 may generate the dates, that is, January 1, January 3, and January 5 as filtering items for sorting.

When a message filtering event occurs, the message box manager 112 displays the generated filtering items and enables a user to select at least one filtering item. When the at least one filtering item is selected via the input unit 140 by the user, the message box manager 112 generates a message list representing messages corresponding to the selected filtering item, and controls and processes a function for displaying the generated message list on the display unit 130. That is, the filter unit 114 filters only messages corresponding to the filtering item selected by the user from all transmitted/received messages, then generates the message list representing only the filtered messages. Here, when a specific filtering item is selected by the user, the filter unit 114 may quickly generate a message list representing messages corresponding to the selected filtering item by grouping or indexing in advance all messages according to the filtering item.

In addition, the message box manager 112 controls and processes a function for generating a separate message box including only the filtered messages according to a user's setting, and for storing and managing the generated message box.

The storage unit 120 stores various programs and data for an overall operation of the mobile terminal. More particularly, the storage unit 120 may store all transmitted/received messages, and classify and save all the transmitted/received messages for each message box under control of the message box manager 112.

The display unit 130 displays the status information generated during an operation of the mobile terminal, numbers and letters, and various images, and displays a message list representing messages included in each message box, or displays a message list representing filtered messages under control of the message box manager 112.

The input unit 140 includes numerical keys, letter keys, and a plurality of function keys, and provides data corresponding to a key pressed by a user to the controller 110.

Figure 2:
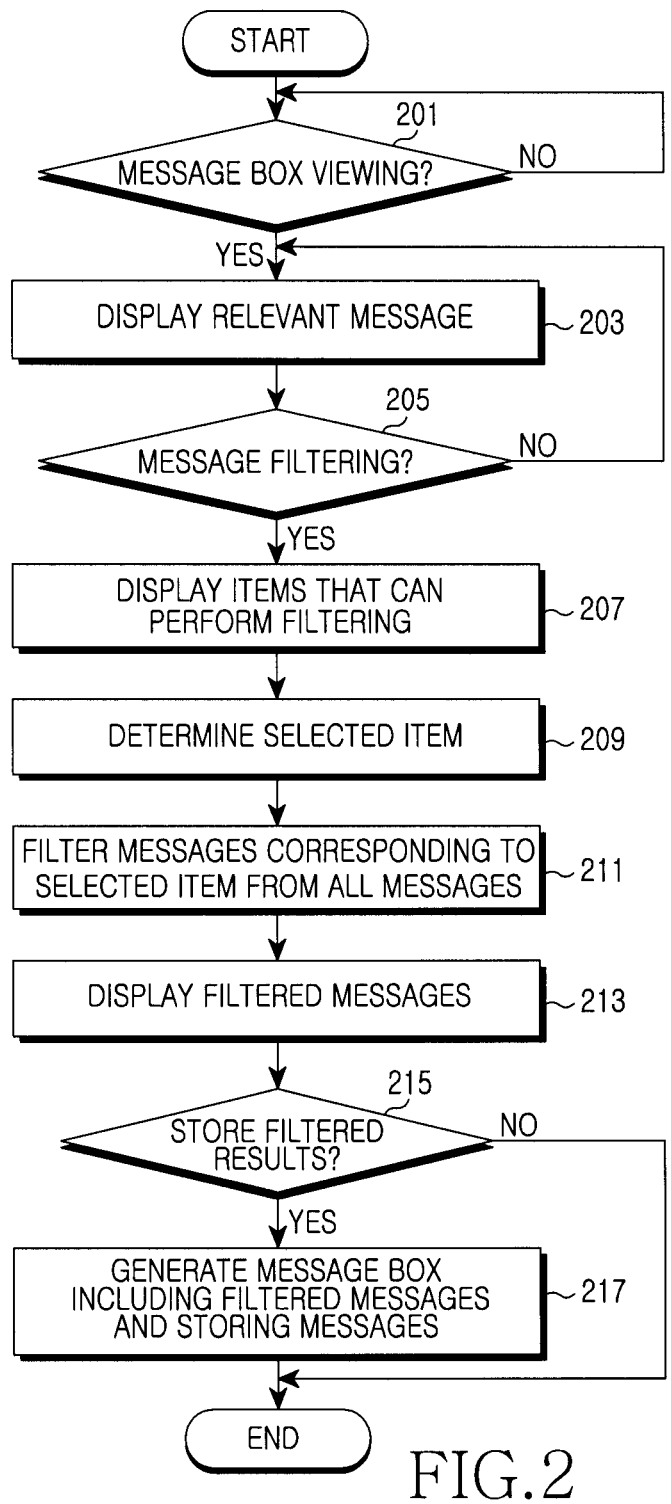
FIG. 2 is a flowchart illustrating a procedure for filtering messages in a mobile terminal according to an exemplary embodiment of the present invention.

FIG. 2 is a flowchart illustrating a procedure for filtering messages in a mobile terminal according to an exemplary embodiment of the present invention.

Figure 3:
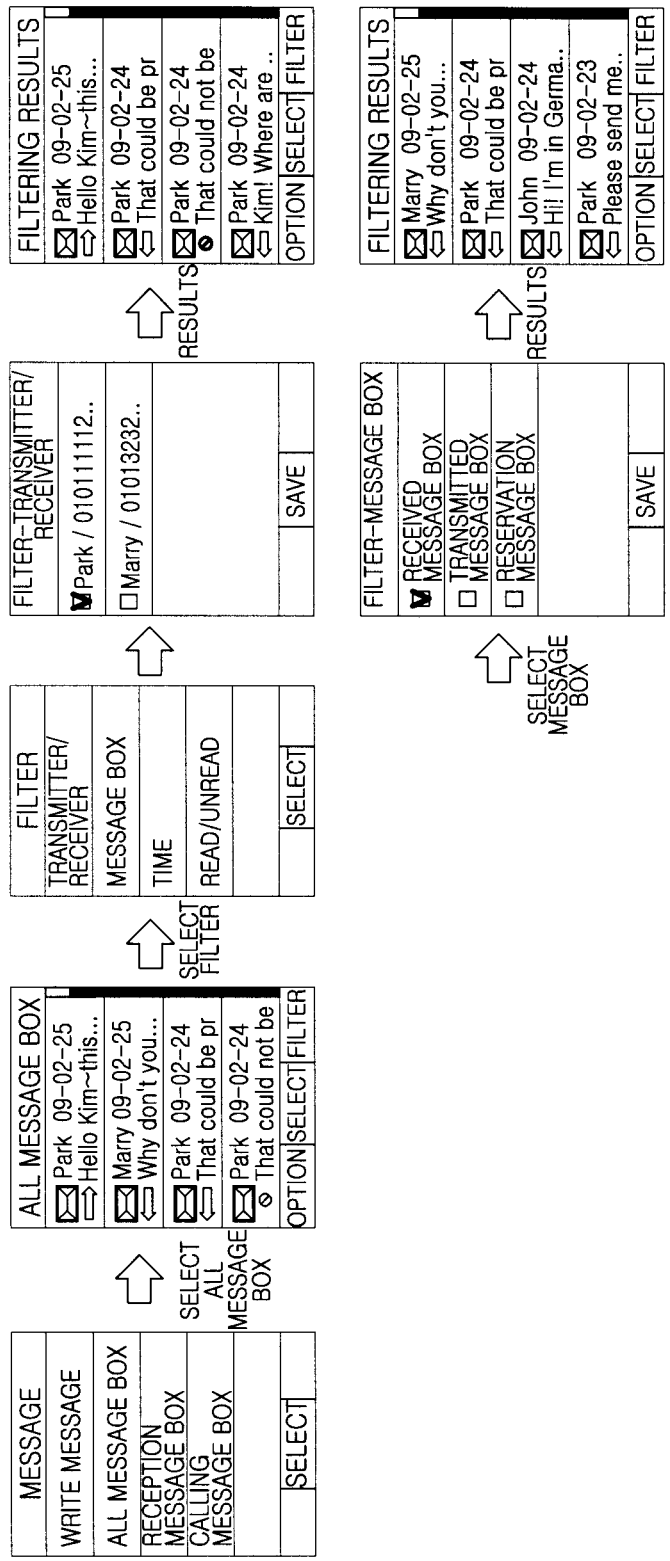
FIG. 3 is a view illustrating a screen for filtering messages in a mobile terminal according to an exemplary embodiment of the present invention.

Referring to FIG. 2, the terminal detects whether a specific message box is selected from basically provided message boxes and an event for viewing messages included in the selected message box occurs in step 201. When the specific message box is selected and an event for viewing relevant messages occurs, the terminal displays the messages included in the selected message box in step 203. For example, as illustrated in FIG. 3, when the all message box is selected from the message box window, the terminal displays all messages transmitted/received at the terminal.

Thereafter, the terminal determines whether a message filtering event occurs in step 205. When the message filtering event occurs, the terminal displays items that can perform filtering in step 207. Here, the items that can perform filtering are generated using meta data of respective messages transmitted/received at the terminal, that is, at least one of a transmission phone number, a reception phone number, a transmission time, a reception time of each message, whether a user reads a message, whether protection is set, and an importance degree. Here, the items that can perform filtering may be roughly classified into a transmitter/receiver (or transmission/reception phone number), a message box, a time, whether a user reads a message, whether protection is set, and an importance degree based on the meta data.

In addition, the items may be classified in more detail according to detailed contents of meta data of messages stored in the terminal. That is, the transmitter/receiver of the items that can perform filtering may be classified for each user. The message box may be classified into a reception message box, a calling message box, a transmission-scheduled message box, and a temporary storage message box. Further, the time may be classified for each date or each month. An item of whether the user reads a message may be classified into read and unread. For example, as illustrated in FIG. 3, in the case where transmission/reception phone number information of all stored messages is phone numbers of users 'Park' and 'Marry', 'Park' and 'Marry' may be set as detailed items of the transmitter/receiver.

Figure 4:
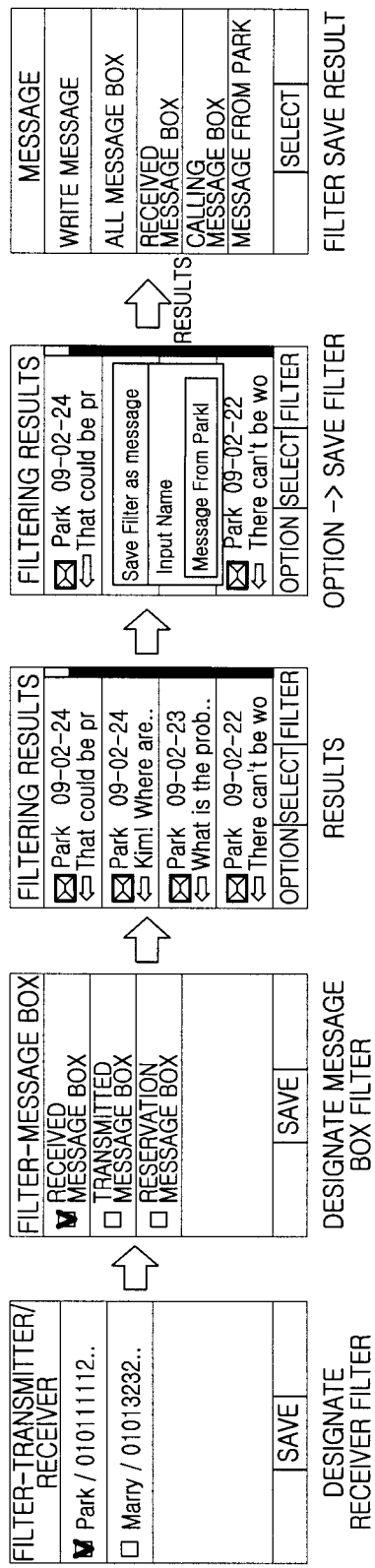
FIG. 4 is a view illustrating a screen for generating a message box including only filtered messages in a mobile terminal according to an exemplary embodiment of the present invention.

The terminal determines an item selected by a user among the items that can perform filtering in step 209, then filters messages corresponding to the selected item from all messages stored in the terminal in step 211 and displays a message list representing filtered messages in step 213. That is, the terminal searches for only messages having meta data corresponding to the selected item, and displays a message list representing only the searched messages. For example, as illustrated in FIG. 3, when an item 'Park' corresponding to a transmitter/receiver is selected from the items that can perform filtering, the terminal may search for and display all messages transmitted/received to/from the user 'Park'. Alternatively, when an item 'reception message box' corresponding to a message box is selected from the items that can perform filtering, the terminal may search for and display message received by the terminal. Here, the terminal may allow the user to select a plurality of items that can perform filtering, and filter and display messages corresponding to the selected plurality of items. For example, as illustrated in FIG. 4, the terminal may allow the user to select an item 'Park' and an item 'reception message box', and display only received messages of messages transmitted/received to/from the user 'Park'. In addition, the terminal may allow the user to select items 'Park', 'Marry', and 'transmitted message box', and display messages transmitted to the users 'Park' and 'Marry' in the designate receiver filter mode in FIG. 4.

Referring back to FIG. 2, the terminal determines whether an event for storing filtering results occurs in step 215. When the event for storing filtering results occurs, the terminal generates a new message box including the filtered messages and stores the new message box in step 217, and ends the algorithm according to an exemplary embodiment of the present invention. At the same time, if the event for storing filtering results does not occur, the terminal ends the algorithm according to an exemplary embodiment of the present invention.

The terminal may display a window requiring a user to input a name of the new message box, receive the name of the new message box from the user, and save the messages. At this point, instead of receiving the name of the new message box from the user, the terminal may generate the name of the new message box based on the selected filtering items, or generate the name of the new message box according to a predetermined name generating method. For example, as illustrated in FIG. 4, when a menu for storing "filtering results" is selected on a screen that displays a message list representing filtered messages, the terminal may display a window requiring the user to custom name a message box to be generated, and generate a new message box that matches the input name. Note that the above generated message box may be accessed using the same method as described above and may be deleted by the user or user's setting.

An exemplary embodiment of the present invention may filter, display, and manage messages according to a user's preference by filtering and displaying only messages that meet a user setting condition, and generating a message box including only the filtered messages in a mobile terminal.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for managing a message in an electronic device, the method comprising:
   generating items for filtering a message using a meta data of messages stored in a storage unit;
   selecting at least one item;
   displaying messages corresponding to the selected item among the messages stored in the storage unit;
   generating a message box comprising the displayed messages;
   generating and displaying a name input box with a text input field; and
   responsive to receiving inputted text in the text input field, storing the generated message box in the storage unit with the generated message box associated with a name corresponding to the inputted text;
   wherein, when the message box is selected, the messages corresponding to the selected at least one item are displayed.

2. The method of claim 1, wherein the meta data comprises at least one of a transmission phone number, a reception phone number, a transmission time, a reception time, whether a message has been read, whether a protection is set, and an importance degree.

3. The method of claim 1, wherein the items for filtering comprise at least one of a transmission phone number, a reception phone number, a transmission time, a reception time, whether a message has been read, whether protection is set, and an importance degree.

4. The method of claim 1, wherein the displaying of the messages corresponding to the selected item comprises:
   searching for only messages having meta data corresponding to the selected item among the messages stored in the electronic device; and
   displaying a message list representing the searched messages.

5. An electronic device comprising:
   a storage unit for storing messages;
   an input unit for receiving inputted text;
   a controller for generating items for filtering a message using a meta data of messages stored in the storage unit, selecting at least one item, searching for messages corresponding to the selected at least one item among the messages stored in the storage unit, and generating a message box comprising the searched messages; and
   a display unit for displaying the searched messages, and for generating and displaying a name input box with a text input field;

wherein the controller, responsive to receiving the inputted text in the text input field, stores the generated message box in the storage unit with the generated message box associated with a name corresponding to the inputted text; and wherein, when the message box is selected, the messages corresponding to the selected at least one item are displayed.

6. The electronic device of claim 5, wherein the meta data comprises at least one of a transmission phone number, a reception phone number, a transmission time, a reception time, whether a message has been read, whether protection is set, and an importance degree.

7. The electronic device of claim 5, wherein the items for filtering comprise at least one of a transmission phone number, a reception phone number, a transmission time, a reception time, whether a message has been read, whether protection is set, and an importance degree.

8. The electronic device of claim 5, wherein the controller searches for only messages having meta data corresponding to the selected item among the messages stored in the electronic device, generates a message list representing the searched messages, and provides the message list to the display unit.

9. An electronic device comprising:

a storage unit for storing messages;

an input unit for receiving inputted text;

a controller for generating items for filtering a message using a meta data of messages stored in a specific message box of the storage unit, selecting at least one of the items, and searching for messages corresponded to the selected at least one of the items among the messages stored in the specific message box; and a display unit for displaying the searched messages, and for generating and displaying a name input box with a text input field;

wherein the controller, responsive to receiving the inputted text in the text input field, stores the generated message box in the storage unit with the generated message box associated with a name corresponding to the inputted text.

10. The electronic device of claim 9, wherein the controller generates a new message box comprising the searched messages.

* * * * *